(12) United States Patent
Liu et al.

(10) Patent No.: US 11,546,259 B2
(45) Date of Patent: Jan. 3, 2023

(54) PACKET SENDING METHOD, NETWORK DEVICE, AND COMPUTER-READABLE STORAGE MEDIUM

(71) Applicant: HUAWEI TECHNOLOGIES CO., LTD., Guangdong (CN)

(72) Inventors: Bingyang Liu, Beijing (CN); Chenggui Xia, Beijing (CN); Guangpeng Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/015,503

(22) Filed: Sep. 9, 2020

(65) Prior Publication Data
US 2020/0403914 A1 Dec. 24, 2020

Related U.S. Application Data

(63) Continuation of application No. PCT/CN2019/077243, filed on Mar. 7, 2019.

(30) Foreign Application Priority Data

Mar. 9, 2018 (CN) .......................... 201810193364.4

(51) Int. Cl.
*H04L 45/74* (2022.01)
*H04L 9/40* (2022.01)
*H04L 67/146* (2022.01)
*H04L 69/163* (2022.01)

(52) U.S. Cl.
CPC .......... *H04L 45/74* (2013.01); *H04L 63/0236* (2013.01); *H04L 67/146* (2013.01); *H04L 69/163* (2013.01)

(58) Field of Classification Search
None
See application file for complete search history.

(56) References Cited

U.S. PATENT DOCUMENTS 7,161,947 B1 * 1/2007 Desai ...................... H04L 67/06
370/389
8,176,203 B1 5/2012 Liu et al.
(Continued)

FOREIGN PATENT DOCUMENTS

| CN | 101697633 A | 4/2010 |
| CN | 102075445 A | 5/2011 |

(Continued)

OTHER PUBLICATIONS

Iyengar et al., "QUIC: A UDP-Based Multiplexed and Secure Transport", drall-ieft-quic-transport-10, Mar. 5, 2018, 101 pages.
(Continued)

*Primary Examiner* — Anh Vu H Ly
(74) *Attorney, Agent, or Firm* — Fish & Richardson P.C.

(57) ABSTRACT

This application provides wireless communications configuration methods and apparatuses. One method includes: receiving, by a service node of a server, a first packet sent by a client device, wherein a destination address of the first packet is an internet protocol (IP) address of the server; sending, by the service node, a second packet to the client device, wherein the second packet comprises the IP address of the service node; and receiving, by the service node, a third packet sent by the client device, wherein a destination address of the third packet is the IP address of the service node that is different from the destination address of the first packet.

10 Claims, 4 Drawing Sheets

| IP header | UDP header | QUIC header |
|---|---|---|
| Source address = IP address of a server<br>Destination address = IP address of a client | | IP address of a target service node |

(56) References Cited

U.S. PATENT DOCUMENTS

| | | | |
|---|---|---|---|
| 9,026,783 | B2 | 5/2015 | Roskind et al. |
| 9,807,016 | B1* | 10/2017 | Sarangapani ............ H04L 67/02 |
| 10,412,159 | B1* | 9/2019 | McCullagh ......... H04L 67/1038 |
| 2005/0114492 | A1* | 5/2005 | Arberg ................ H04L 29/1282 709/223 |
| 2015/0256448 | A1 | 9/2015 | Xiao et al. |
| 2015/0281098 | A1* | 10/2015 | Pettit ...................... H04L 45/64 370/235 |
| 2016/0337464 | A1* | 11/2016 | Eriksson ................ H04L 67/42 |
| 2018/0198854 | A1* | 7/2018 | Rong ...................... H04L 67/42 |
| 2018/0324245 | A1* | 11/2018 | Luo ..................... H04L 67/1002 |
| 2018/0359329 | A1* | 12/2018 | Vacaro ................ H04L 67/2819 |
| 2019/0229903 | A1* | 7/2019 | Balasubramanian ........................ H04L 9/0861 |

FOREIGN PATENT DOCUMENTS

| | | |
|---|---|---|
| CN | 106330715 A | 1/2017 |
| CN | 106878193 A | 6/2017 |
| WO | WO-2018149684 A1 * | 8/2018 |

OTHER PUBLICATIONS

Miao et al., "SilkRoad: Making Stateful Layer-4 Load Balancing Fast and Cheap Using Switching" ACM SIGCOMM 2017, 14 pages.

Alzoubi et al., "A Practical Architecture for an Anycast CDN", ACM Transactions on the Web, vol. 5, No. 4, Article 17, Publication date: Oct. 2011, 29 pages.

Thomson et al., "Using Transport Layer Security (TLS) to Secure QUIC", draft-ietf-quic-tls-07, Oct. 13, 2017, 38 pages.

Rescorla, "The Transport Layer Security (TLS) Protocol Version 1.3", draft-ietf-tls-tls13-21, Jul. 3, 2017, 143 pages.

Iyengar et al., "QUIC: A UDP-Based Multiplexed and Secure Transport", draft-ietf-quic-transport-07, Oct. 13, 2017, 32 pages.

Office Action issued in Chinese Application No. 201810193364.4 dated Feb. 6, 2020, 28 pages (With English Translation).

PCT International Search Report and Written Opinion in International Application No. PCT/CN2019/077,243, dated May 27, 2019, 16 pages (With English Translation).

Langley et al., "The QUIC Transport Protocol: Design and Internet-Scale Deployment," Proceedings of the Conference of the ACM Special Interest Group on Data Communication, Aug. 7, 2017, pp. 183-196.

Iyengar et al., "QUIC: A UDP-Based Multiplexed and Secure Transport draft-ietf-quic-transport-09," IETF, Jan. 28, 2018, 97 pages.

Duke, "QUIC-LB: Using Load Balancers to Generate QUIC Connection IDs draft-duke-quic-load-balancers-00.txt," IETF, Feb. 12, 2018, 11 pages.

Extended European Search Report in European Application No. 19763170.8, dated Mar. 18, 2021, 8 pages.

Office Action issued in Chinese Application No. 202110935235.X dated May 6, 2022, 14 pages.

* cited by examiner

PACKET SENDING METHOD, NETWORK DEVICE, AND COMPUTER-READABLE STORAGE MEDIUM

CROSS-REFERENCE TO RELATED APPLICATIONS

This application is a continuation of International Application No. PCT/CN2019/077243, filed on Mar. 7, 2019, which claims priority to Chinese Patent Application No. 201810193364.4, filed on Mar. 9, 2018. The disclosures of the aforementioned applications are hereby incorporated by reference in their entireties.

TECHNICAL FIELD

This application relates to the computer field, and more specifically, to a packet sending method, a network device, and a computer-readable storage medium.

BACKGROUND

Before accessing a server (such as a data center), a client first needs to establish a connection to the server. In a conventional technology, a transport layer connection is bound to a 5-tuple. Once the connection between the client and the server is successfully established, a 5-tuple used in a connection establishment process is not allowed to be changed; otherwise, the connection is disconnected.

In an actual communication process, the client usually initiates a connection establishment request by using an internet protocol (internet protocol, IP) address of the server (which may be, for example, an IP address of a front-end server of the server) as a destination IP address. Once the connection between the client and the server is successfully established, the IP address of the server that is used as the destination IP address of the client is bound to the connection, and is not allowed to be changed.

The server usually includes at least one service node, and a target service node configured to serve the client is one of the at least one network node (such as a topologically nearest node of the client). The IP address of the server is used as the destination address for all packets sent by the client, and the packets usually cannot be routed to the target service node based only on the IP address of the server. Therefore, in the conventional technology, the server needs to record a large amount of binding relationship information (which may be used to indicate the target service node corresponding to the client), so as to correctly route the packets sent by the client to the target service node. Continuous scale expansion of the server is accompanied with an increasing quantity of service nodes included in the server, and consequently the server needs to record an increasing amount of binding relationship information, causing high network overheads by recording a large amount of binding relationship information.

SUMMARY

According to a first aspect, a packet sending method is provided. The method includes: receiving, by a target service node of a server, a first packet sent by a client, where a destination address of the first packet is an IP address of the server, the server includes at least one service node, the target service node is one of the at least one service node, and the IP address of the server is different from an IP address of the target service node; sending, by the target service node, a second packet to the client, where the second packet includes the iP address of the target service node; and receiving, by the target service node, a third packet sent by the client, where a destination address of the third packet is the IP address of the target service node.

According to the method provided in this application, in a process of establishing a connection between the client and the server, the target service node records the IP address of the node in the second packet. After receiving the second packet, the client changes the destination address from the IP address of the server to the IP address of the target service node to send the third packet. In this way, the server may directly forward the third packet to the target service node with no need to record a correspondence between the client and the target service node, thereby reducing network overheads.

In a possible implementation, a destination port number of the first packet is a port number of the server, a destination port number of the second packet is a port number of the client, the second packet further includes a port number of the target service node, and a destination port number of the third packet is the port number of the target service node.

According to the method provided in this application, when sending the second packet, the target service node may record the port number of the node in the packet. After receiving the second packet, the client changes the destination port number of the third packet to the port number of the target service node, so that the third packet may be directly routed to an accurate port location of the target service node, thereby simplifying a processing procedure.

In a possible implementation, the second packet is a QUIC protocol-based packet.

In a possible implementation, the first packet is a QUIC initial packet, and the second packet is a QUIC handshake packet or a QUIC retry packet.

In a possible implementation, a source address of the first packet is an IP address of the client, a source address of the second packet is the IP address of the server, and a destination address of the second packet is the IP address of the client.

In a possible implementation, a connection established between the client and the target service node is a first connection, the second packet includes a connection identifier, the third packet includes the connection identifier, and the method further includes: determining, by the target service node based on 5-tuple information and/or the connection identifier in the third packet, that the third packet belongs to the first connection.

In a possible implementation, the method further includes: sending, by the target service node, a fourth packet to the client, where a source address of the fourth packet is the IP address of the target service node, and a destination address of the fourth packet is the IP address of the client.

According to a second aspect, a packet sending method is provided. The method includes: sending, by a client, a first packet, where a destination address of the first packet is an IP address of a server; receiving, by the client, a second packet sent by a target service node, where the second packet includes an IP address of the target service node, the server includes at least one service node, the target service node is one of the at least one service node, and the IP address of the target service node is different from the IP address of the server; and sending, by the client, a third packet to the target service node, where a destination address of the third packet is the IP address of the target service node.

According to the method provided in this application, in a process of establishing a connection between the client and the server, the target service node records the IP address of the node in the second packet. After receiving the second packet, the client changes the destination address from the IP address of the server to the IP address of the target service node to send the third packet. In this way, the server may directly forward the third packet to the target service node with no need to record a correspondence between the client and the target service node, thereby reducing network overheads.

In a possible implementation, a destination port number of the first packet is a port number of the server, a destination port number of the second packet is a port number of the client, the first packet further includes a port number of the target service node, and a destination port number of the third packet is the port number of the target service node.

According to the method provided in this application, when sending the second packet, the target service node may record the port number of the node in the packet. After receiving the second packet, the client changes the destination port number of the third packet to the port number of the target service node, so that the third packet may be directly routed to an accurate port location of the target service node, thereby simplifying a processing procedure.

In a possible implementation, the second packet is a QUIC protocol-based packet.

In a possible implementation, the first packet is a QUIC initial packet, and the second packet is a QUIC handshake packet or a QUIC retry packet.

In a possible implementation, a source address of the first packet is an IP address of the client, a source address of the second packet is the IP address of the server, and a destination address of the second packet is the IP address of the client.

In a possible implementation, a connection established between the client and the target service node is a first connection, and the method further includes: determining, by the client based on 5-tuple information in the second packet, that the second packet belongs to the first connection.

In a possible implementation, the third packet includes a connection identifier, and the method further includes: receiving, by the client, a fourth packet sent by the target service node, where the fourth packet includes the connection identifier; and determining, by the client based on 5-tuple information and/or the connection identifier in the fourth packet, that the fourth packet belongs to the first connection.

According to a third aspect, a network device is provided, and includes a module configured to perform the method in any one of the first aspect or the implementations of the first aspect.

According to a fourth aspect, a network device is provided, and includes a module configured to perform the method in any one of the second aspect or the implementations of the second aspect.

According to a fifth aspect, a network device is provided, and the network device includes a processor and a transceiver for performing the method in any one of the first aspect or the implementations of the first aspect.

According to a sixth aspect, a network device is provided, and the network device includes a processor and a transceiver for performing the method in any one of the second aspect or the implementations of the second aspect.

According to a seventh aspect, a computer-readable storage medium is provided. The computer-readable storage medium is configured to store a computer software instruction, and the computer-readable storage medium includes a program designed for performing the method in any one of the first aspect or the implementations of the first aspect.

According to an eighth aspect, a computer-readable storage medium is provided. The computer-readable storage medium is configured to store a computer software instruction, and the computer-readable storage medium includes a program designed for performing the method in the second aspect or any implementation of the second aspect.

According to a ninth aspect, a computer program product is provided. The computer program product includes computer program code, and when the computer program code is run on a computer, the computer is enabled to perform the method in any one of the first aspect or the implementations of the first aspect.

According to a tenth aspect, a computer program product is provided. The computer program product includes computer program code, and when the computer program code is run on a computer, the computer is enabled to perform the method in any one of the second aspect or the implementations of the second aspect.

DESCRIPTION OF EMBODIMENTS

Technical solutions provided in the embodiments of this application may be applied to a scenario in which a client communicates with a server by establishing a transport layer connection. For example, the technical solutions may be applied to a scenario in which a client performs data communication with a data center, or may be applied to a content delivery network (content delivery network, CDN).

The client mentioned in the embodiments of this application may be located on a terminal device, and the client may be, for example, an application (application, APP) on the terminal device. The terminal device may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network, a terminal device in a future evolved public land mobile network (public land mobile network, PLMN), or the like. The embodiments of this application impose no limitation thereto.

Currently, on the Internet, as a quantity of clients continuously increases, a quantity of clients accessing a service also continuously increases. To meet access requirements of a large quantity of clients, at least one service node usually needs to be set on a server. Generally, at least two or at least three service nodes needs to be set on the server. The service node may be an entity on the server that can provide one or more services. The service node may also be referred to as a service instance on some occasions. The service node may be, for example, a physical server, a virtual machine, or even a load balancer on the server that has an application layer protocol. A specific form of the service node is not limited in the embodiments of this application.

Figure 1:
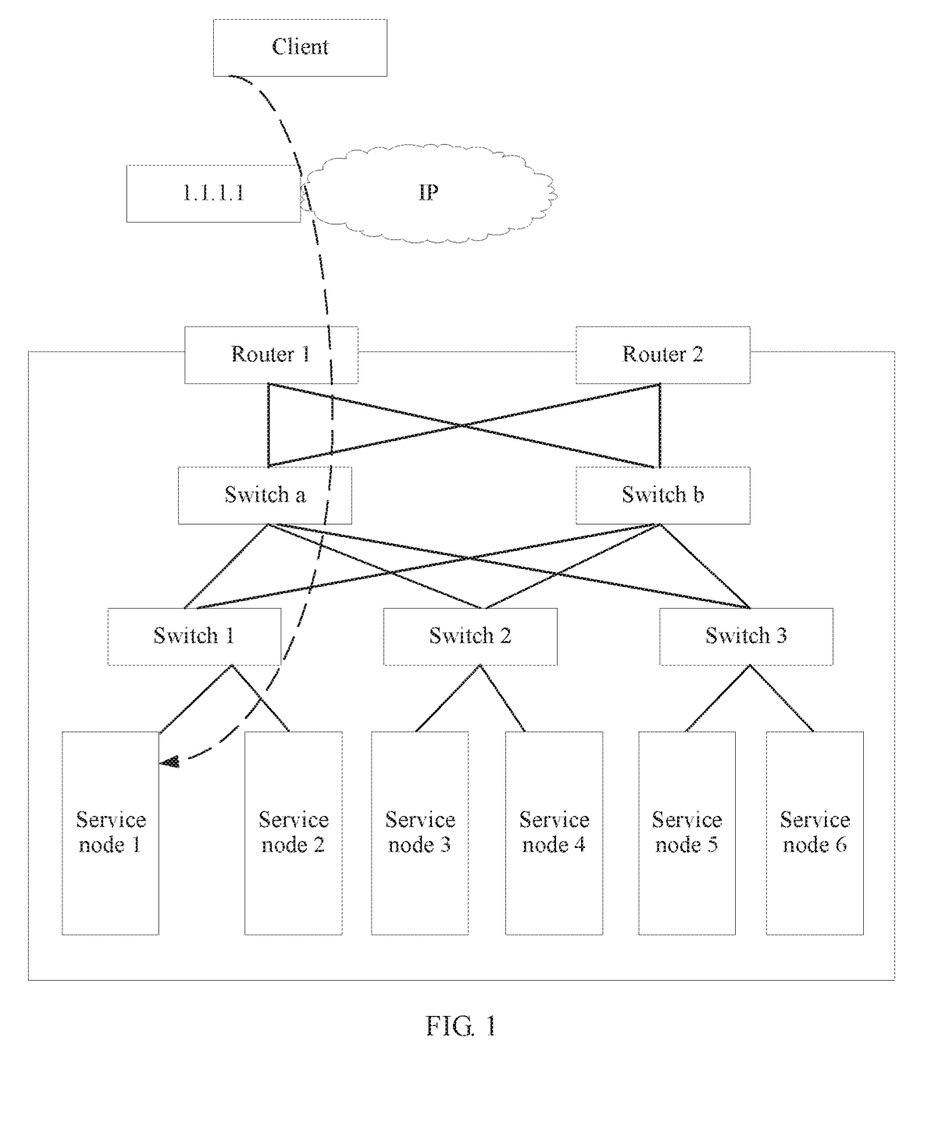
FIG. 1 is a schematic diagram of a conventional mode of communication between a client and a service node.

With reference to FIG. 1, the following uses a data center as an example to describe a conventional mode of communication between a client and a service node.

When the client needs to obtain a specific service from a server, the client sends a first packet by using an IP address of the server as a destination address. The first packet may be, for example, a connection request packet. The IP address of the server may be, for example, an IP address of a front-end server of the server. As shown in FIG. 1, the server is the data center, and an IP address of the data center is 1.1.1.1. The client may send the first packet to the data center by using 1.1.1.1 as the destination IP address. After receiving the connection establishment request, the data center may select a service node 1 from service nodes 1 to 6 as a target service node of the client based on a load status of a service node in the data center or a topological distance between a service node and the client. After a connection is successfully established, a 5-tuple including an IP address of the client, a port number of the client, the IP address of the server, a port number of the server, and a transport layer protocol type used in a connection establishment process is bound to the connection between the client and the server, and is not allowed to be changed (once the 5-tuple is changed, the connection is disconnected). To ensure that a subsequent packet sent by the client through the connection can be correctly routed to the service node 1, the server needs to record a binding relationship between the client and the service node 1. As quantities of clients and service nodes increase, high network overheads are caused by recording the binding relationship between the client and the service node.

As communications technologies develop, some new protocol types emerge, such as a quick user datagram protocol internet connections (quick UDP internet connection, QUIC) protocol. These new protocols allow changing the 5-tuple after a connection is established and it is ensured that the connection does not break. In the embodiments of this application, flexibility of these protocols is used to improve a communication mode in the connection establishment process, thereby reducing network overheads required for in the conventional mode of communication between the client and the server shown in FIG. 1.

Figure 2:
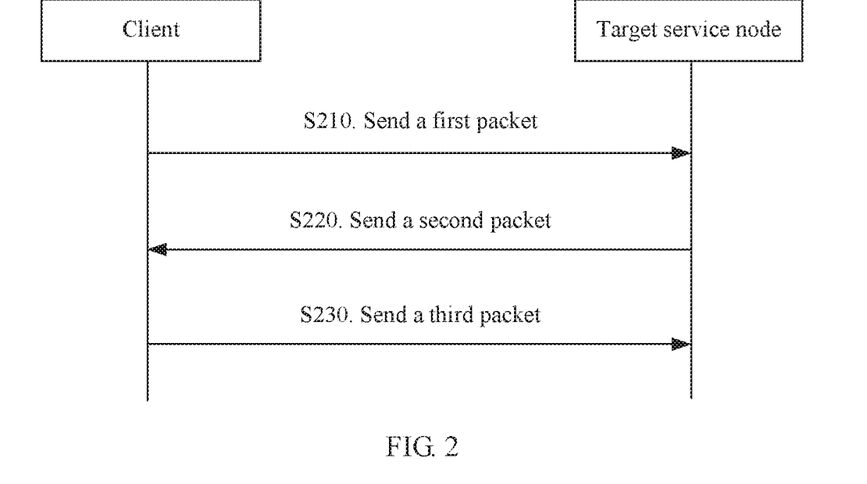
FIG. 2 is a schematic flowchart of a packet sending method according to an embodiment of this application.

With reference to FIG. 2, the following describes in detail a packet sending method according to an embodiment of this application. As shown in FIG. 2, the method may include step 210 to step 230.

Step 210: A client sends a first packet. A source address of the first packet is an IP address of the client, and a destination IP address of the first packet is an IP address of a server. The IP address of the server may be, for example, a front-end IP address of the server, or another IP address of the server that is open for external access to the server. The client may find the IP address of the server by using, for example, a domain name system (domain name system, DNS).

The first packet may be referred to as a connection request packet, and the first packet may be, for example, an initial packet sent by the client to the server. QUIC is used as an example. The first packet may be a QUIC initial packet (QUIC initial packet).

The first packet is received by a target service node of the server. A manner of determining the target service node is not specifically limited in this embodiment of this application. For example, the server may select a lightly-loaded service node as the target service node based on a load status of a service node. For another example, the server may select a topologically nearest node of the client as the target service node based on a topological relationship between the client and a service node.

Figure 3:
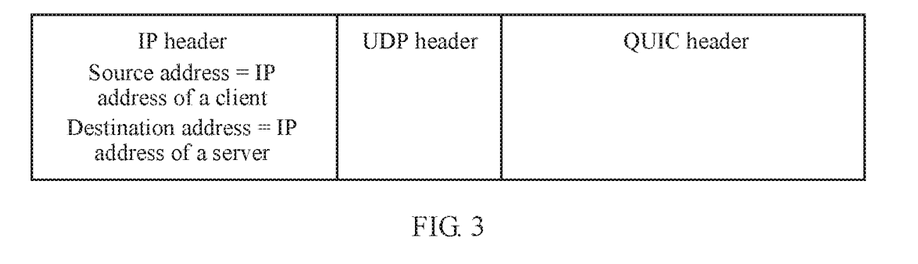
FIG. 3 is an example diagram of a first packet according to an embodiment of this application.

FIG. 3 is an example diagram of a first packet according to an embodiment of this application. QUIC is used as an example. The client may record 5-tuple information such as a source address and a destination address in an IP header of the first packet.

Step 220: The target service node sends a second packet to the client. A source address of the second packet is the IP address of the server, and a destination address is the IP address of the client.

The second packet may be referred to as a connection reply packet, and the second packet may be, for example, an initial packet sent by the server to the client. A QUIC protocol is used as an example. The second packet may be a QUIC retry packet (QUIC retry packet) or a QUIC handshake packet (QUIC handshake packet).

The second packet may include an IP address of the target service node. The IP address of the target service node is different from the IP address of the server. The IP address of the target service node may uniquely identify a location of the target service node.

It should be understood that a packet between the client and the target service node may be forwarded by using an intermediate node (such as a front-end server of the server or a router), and a location of the intermediate node and a quantity of intermediate nodes are related to a specific network form. This embodiment of this application imposes no limitation thereto.

Figure 4:
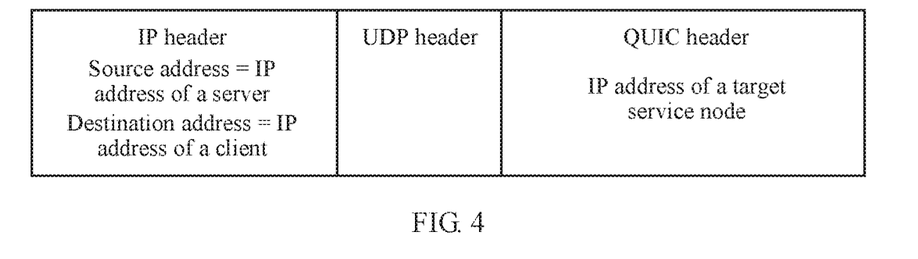
FIG. 4 is an example diagram of a second packet according to an embodiment of this application.

FIG. 4 is an example diagram of the second packet according to this embodiment of this application. A QUIC protocol is used as an example. The target service node sets the IP address of the node in a QUIC header, and sets 5-tuple information such as a source address and a destination address in an IP header.

FIG. 4 is merely an example for description. This application is not limited thereto. For example, the target service node may alternatively set the IP address of the node at a load location of a QUIC packet.

Step 230: The client sends a third packet to the target service node by using the IP address of the target service node as a destination address.

After receiving the second packet, the client may extract the IP address of the target service node from the second packet, and use the IP address of the target service node as the destination IP address of the subsequently sent third packet.

In this embodiment of this application, the third packet may be a QUIC protected packet (QUIC protected packet), a QUIC initial packet, or a QUIC handshake packet. The QUIC protected packet may be a data packet.

Figure 5:
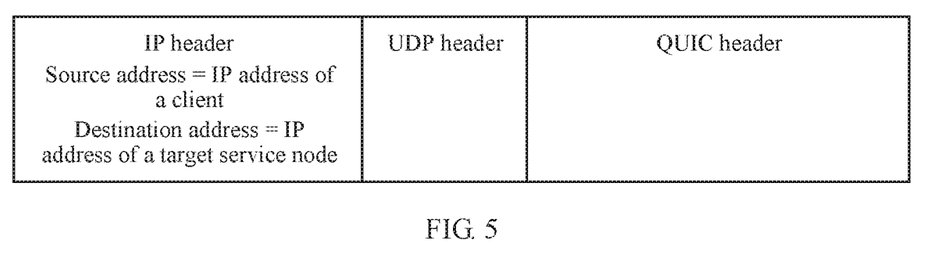
FIG. 5 is an example diagram of a third packet according to an embodiment of this application.

FIG. 5 is an example diagram of the third packet according to this embodiment of this application. QUIC is used as an example. After extracting the IP address of the target service node, the client sets the destination address of the third packet to the IP address of the target service node.

The destination address of the third packet is the IP address of the target service node, so that the server may directly forward the third packet to the target service node with no need to record a binding relationship between the server and the client by using a conventional technology, thereby reducing network overheads.

It should be noted that, in this embodiment of this application, for ease of description, one or more packets sent by the client after the second packet are collectively referred to as the third packet. In other words, it can be understood that the third packet is any packet sent by the client after the second packet.

Optionally, in some embodiments, the second packet may further include a port number of the target service node. The client may send the third packet to the target service node by using the port number of the target service node as a destination port number. Specifically, a destination port number of the first packet is a port number of the server, a destination port number of the second packet is a port number of the client, the second packet further includes the port number of the target service node, and the destination port number of the third packet is the port number of the target service node.

According to the method provided in this embodiment of this application, when sending the second packet, the target service node may record the port number of the node in the packet. After receiving the second packet, the client changes the destination port number of the third packet to the port number of the target service node, so that the third packet may be directly routed to an accurate port location of the target service node, thereby simplifying a processing procedure.

The source address and the destination address mentioned in this application each may be a public IP address or a private IP address. This embodiment of this application imposes no specific limitation thereto. The public IP address is an address obtained through translation by using an address translator. The private IP address is an original address not translated by using an address translator.

In addition, a source port number and the destination port number mentioned in this application each may be a public network port number or a private network port number. This embodiment of this application imposes no specific limitation thereto.

Optionally, for example, after sending the first packet, the client locally records a connection related to the first packet as a first connection. Then the client determines that all packets related to the first packet are packets within the first connection.

Specifically, after receiving the second packet sent by the target service node, the client identifies the second packet based on 5-tuple information in the second packet, and determines that the second packet belongs to the first connection.

A communication protocol on which a connection establishment manner shown in FIG. 2 is based is not specifically limited in this embodiment of this application. The communication protocol may be a newly introduced communication protocol, or may be an improvement of connection establishment in a conventional protocol. The following uses a QUIC protocol as an example for detailed description.

The QUIC protocol is a UDP-based low-latency internet transport layer protocol. The QUIC protocol allows changing information in a 5-tuple, such as the IP addresses and the port numbers of the client and the server in the 5-tuple, after the connection is established and it is ensured that the connection does not break. However, the conventional QUIC protocol does not allow changing the information in the 5-tuple in the connection establishment process. Consequently, in the connection establishment process and in an initial phase after connection establishment, a network side still needs to maintain a binding relationship between the client and the target service node, causing relatively high network overheads. In this embodiment of this application, the connection establishment process for the QUIC protocol is improved, thereby reducing network overheads.

For ease of understanding, this embodiment of this application briefly describes a handshake communication process for the QUIC protocol.

Step 1: The client sends a first initial packet, where the first initial packet includes a connection identifier connection ID' determined by the client. In addition, the client locally records a connection related to the first initial packet as the first connection.

Step 2: After receiving the first initial packet, the target service node sends a retry packet or a first handshake packet to the client according to an actual situation.

It should be noted that the retry packet or the first handshake packet carries the IP address and/or the port number of the target service node. In addition, the target service node may further add a connection identifier connection ID determined by the node to the retry packet or the first handshake packet. A destination IP address and/or a port number of the first initial packet are/is different from the IP address and/or the port number of the target service node.

It should be understood that the connection ID carried in the retry packet or the first handshake packet may be the same as or may be different from the connection ID'. This embodiment of this application imposes no specific limitation thereto.

After sending the first handshake packet to the client, the target service node locally records a connection related to the first handshake packet as the first connection.

Step 3: After receiving the retry packet sent by the target service node, the client sends, by using the IP address of the target service node as a destination address and/or by using the port number of the target service node as a destination port number, a second initial packet to the target service node to re-establish a connection. A connection identifier used by the second initial packet may be any connection identifier. For example, the connection identifier used by the second initial packet may be the connection ID or the connection ID'. For another example, the connection identifier used by the second initial packet may be another connection identifier different from the connection ID and the connection ID'.

Optionally, the client may determine, based on 5-tuple information in the retry packet, that the retry packet is a packet within the first connection.

After receiving the first handshake packet sent by the target service node, the client sends a protected packet or a second handshake packet to the target service node by using the IP address of the target service node as a destination address. A connection identifier used by the second handshake packet may be the connection ID, and a connection identifier used by the protected packet may be the connection ID' or the connection ID.

Step 4: After receiving the second initial packet sent by the client, the target service node may send the retry packet or the handshake packet to the client according to an actual situation.

After receiving the protected packet or the handshake packet sent by the client, the target service node determines, based on 5-tuple information and/or the connection identifier in the protected packet or the handshake packet, that the protected packet or the handshake packet belongs to a packet within the first connection. In addition, the target service node sends a fourth packet to the client. A source address of the fourth packet is the IP address of the target service node, a destination address is the IP address of the client, and a connection identifier used by the fourth packet is the connection ID.

Step 5: After receiving the fourth packet, the client identifies the fourth packet based on 5-tuple information and/or the connection identifier in the fourth packet, and determines that the fourth packet belongs to a packet within the first connection.

The foregoing describes in detail the method embodiment of this application with reference to FIG. 1 to FIG. 5. The following describes in detail apparatus embodiments of this application with reference to FIG. 6 to FIG. 9. It should be understood that descriptions of the method embodiment correspond to descriptions of the apparatus embodiments. Therefore, for parts that are not described in detail, refer to the method embodiment above.

Figure 6:
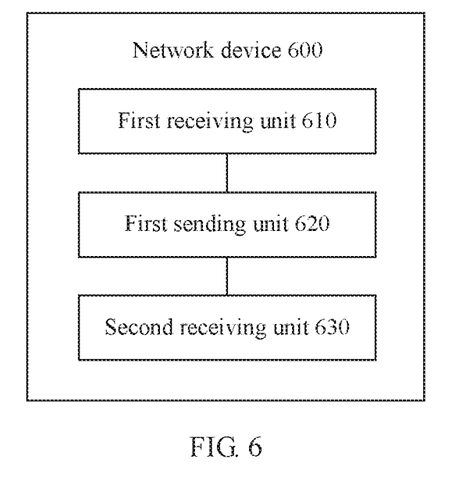
FIG. 6 is a schematic block diagram of a network device according to an embodiment of this application.

FIG. 6 is a schematic block diagram of a network device according to an embodiment of this application. The network device 600 includes a first receiving unit 610, a first sending unit 620, and a second receiving unit 630.

The first receiving unit 610 is configured to receive a first packet sent by a client, where a source address of the first packet is an IP address of the client, and a destination IP address of the first packet is an IP address of a server. The IP address of the server may be, for example, a front-end IP address of the server, or another IP address of the server that is open for external access to the server. The client may find the IP address of the server by using, for example, a DNS.

The first packet may be referred to as a connection request packet, and the first packet may be, for example, an initial packet sent by the client to the server. QUIC is used as an example. The first packet may be a QUIC initial packet.

The first sending unit 620 is configured to send a second packet to the client, where the second packet includes an IP address of the network device.

The second packet may be referred to as a connection reply packet, and the second packet may be, for example, an initial packet sent by the server to the client. A QUIC protocol is used as an example. The second packet may be a QUIC retry packet or a QUIC handshake packet.

The second receiving unit 630 is configured to receive a third packet sent by the client, where a destination address of the third packet is the IP address of the network device.

After receiving the second packet, the client may extract the IP address of the network device from the second packet, and use the IP address of the network device as the destination IP address of the subsequently sent third packet.

In this embodiment of this application, the third packet may be a QUIC protected packet, a QUIC initial packet, or a QUIC handshake packet. The QUIC protected packet may be a data packet.

The destination address of the third packet is the IP address of the network device, so that the server may directly forward the third packet to the network device with no need to record a binding relationship between the server and the client by using a conventional technology, thereby reducing network overheads.

Optionally, in some embodiments, the second packet may further include a port number of a target service node. The client may send the third packet to the target service node by using the port number of the target service node as a destination port number.

Specifically, a destination port number of the first packet is a port number of the server, a destination port number of the second packet is a port number of the client, the second packet further includes the port number of the target service node, and the destination port number of the third packet is the port number of the target service node.

According to the method provided in this embodiment of this application, when sending the second packet, the network device may record the port number of the node in the packet. After receiving the second packet, the client changes the destination port number of the third packet to the port number of the network device, so that the third packet may be directly routed to an accurate port location of the network device, thereby simplifying a processing procedure.

Optionally, in this embodiment of this application, the second packet may be a QUIC protocol-based packet.

Figure 7:
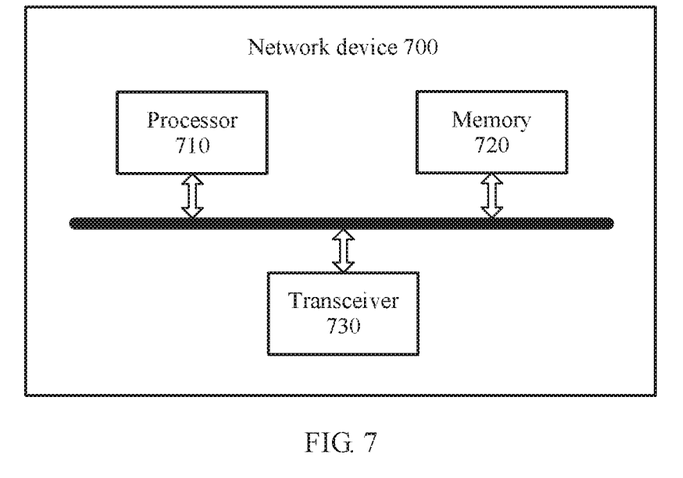
FIG. 7 is a schematic block diagram of another network device according to an embodiment of this application.

As shown in FIG. 7, an embodiment of this application further provides a network device 700. The network device 700 includes a processor 710, a memory 720, and a transceiver 730. The memory 720 is configured to store an instruction, and the processor 710 and the transceiver 730 are configured to execute the instruction stored in the memory 720.

It should be understood that the network device 600 shown in FIG. 6 or the network device 700 shown in FIG. 7 may be configured to perform a related operation or procedure in the method embodiments, and operations and/or functions of the units in the network device 600 or the network device 700 are separately used to implement corresponding procedures in the method embodiments. For brevity, details are not described herein again.

Figure 8:
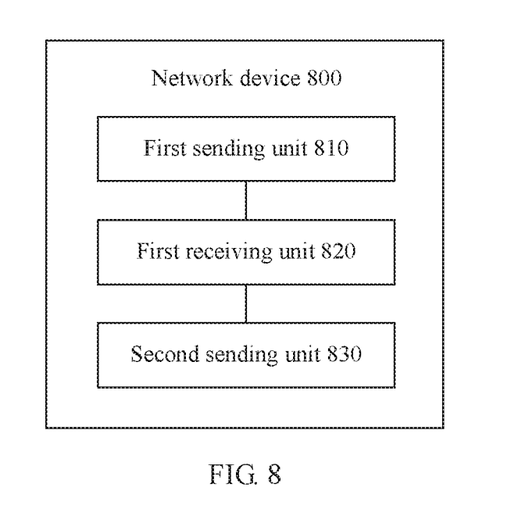
FIG. 8 is a schematic block diagram of another network device according to an embodiment of this application.

FIG. 8 is a schematic block diagram of another network device according to an embodiment of this application. The network device 800 includes a first receiving unit 810, a first sending unit 820, and a second receiving unit 830.

The first sending unit 810 is configured to send a first packet, where a source address of the first packet is an IP address of a client, and a destination IP address of the first packet is an IP address of a server. The IP address of the server may be, for example, a front-end IP address of the server, or another IP address of the server that is open for external access to the server. The client may find the IP address of the server by using, for example, a DNS.

The first packet may be referred to as a connection request packet, and the first packet may be, for example, an initial packet sent by the network device to the server. QUIC is used as an example. The first packet may be a QUIC initial packet.

The first receiving unit 820 is configured to receive a second packet sent by a target service node, where the second packet includes an IP address of the target service node.

The second packet may be referred to as a connection reply packet, and the second packet may be, for example, an initial packet sent by the server to the network device. A QUIC protocol is used as an example. The second packet may be a QUIC retry packet or a QUIC handshake packet.

The second sending unit 830 is configured to send a third packet to the target service node, where a destination address of the third packet is the IP address of the target service node.

After receiving the second packet, the network device may extract the IP address of the target service node from the second packet, and use the IP address of the target service node as the destination IP address of the subsequently sent third packet.

In this embodiment of this application, the third packet may be a QUIC protected packet, a QUIC initial packet, or a QUIC handshake packet. The QUIC protected packet may be a data packet.

The destination address of the third packet is the IP address of the target service node, so that the server may directly forward the third packet to the target service node with no need to record a binding relationship between the server and the network device by using a conventional technology, thereby reducing network overheads.

Optionally, in some embodiments, the second packet may further include a port number of the target service node. The network device may send the third packet to the target service node by using the port number of the target service node as a destination port number.

Specifically, a destination port number of the first packet is a port number of the server, a destination port number of the second packet is a port number of the client, the second packet further includes the port number of the target service node, and the destination port number of the third packet is the port number of the target service node.

According to the method provided in this embodiment of this application, when sending second packet, the target service node may record the port number of the node in the packet. After receiving the second packet, the network device changes the destination port number of the third packet to the port number of the target service node, so that the third packet may be directly routed to an accurate port location of the target service node, thereby simplifying a processing procedure.

Optionally, in this embodiment of this application, the second packet may be a QUIC protocol based-packet.

Figure 9:
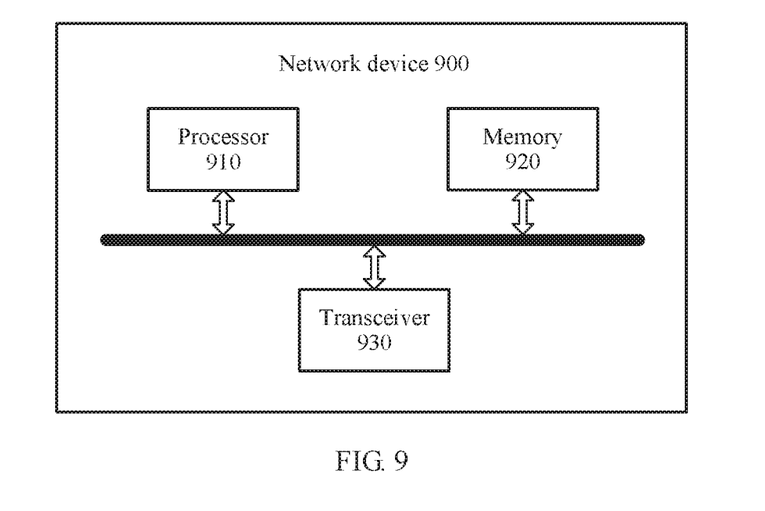
FIG. 9 is a schematic block diagram of another network device according to an embodiment of this application.

As shown in FIG. 9, an embodiment of this application further provides a network device 900. The network device 900 includes a processor 910, a memory 920, and a transceiver 930. The memory 920 is configured to store an instruction, and the processor 910 and the transceiver 930 are configured to execute the instruction stored in the memory 920.

It should be understood that the network device 800 shown in FIG. 8 or the network device 900 shown in FIG. 9 may be configured to perform a related operation or procedure in the method embodiments, and operations and/or functions of the units in the network device 800 or the network device 900 are separately used to implement corresponding procedures in the method embodiments. For brevity, details are not described herein again.

It should be understood that the processor mentioned in this embodiment of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and serves as an external cache. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate or transistor logic device, or a discrete hardware component, the memory (storage module) is integrated into the processor.

It should be noted that the memory described in this specification is intended to include but not limited to these memories and any memory of another proper type.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet sending method performed by a service node of a server, comprising:
   receiving, via the server that comprises one or more service nodes, a first packet from a client device, wherein a destination address of the first packet is an internet protocol (IP) address of the server;
   sending a second packet to the client device, wherein the second packet comprises an IP address of the service node, a port number of the service node, and a connection identifier identifying a connection established between the client device and the service node;
   receiving, from the client device, a third packet that comprises the connection identifier and 5-tuple information, wherein a destination address of the third packet is the IP address of the service node that is different from the destination address of the first packet, and wherein a destination port number of the third packet is the port number of the service node; and
   determining, based on the 5-tuple information and the connection identifier comprised in the third packet, that the third packet belongs to the connection.

2. The method according to claim 1, wherein a destination port number of the first packet is a port number of the server, and wherein a destination port number of the second packet is a port number of the client device.

3. The method according to claim 1, wherein the second packet is a quick user datagram protocol internet connections (QUIC) protocol-based packet.

4. The method according to claim 3, wherein the first packet is a QUIC initial packet, the second packet is a QUIC handshake packet or a QUIC retry packet.

5. The method according to claim 1, wherein a source address of the first packet is an IP address of the client device, a source address of the second packet is the IP address of the service node, and a destination address of the second packet is the IP address of the client device.

6. The method according to claim 1, wherein the method further comprises:
   sending, by the service node, a fourth packet to the client device, wherein a source address of the fourth packet is the IP address of the service node, and a destination address of the fourth packet is the IP address of the client device.

7. A service node of a server, wherein the service node comprising:
   at least one processor;
   a memory coupled to the at least one processor and storing programming instructions that, when executed by the at least one processor, instruct the service node to:
   receive, via the server that comprises one or more service nodes, a first packet from a client device, wherein a destination address of the first packet is an internet protocol (IP) address of the server;
   send a second packet to the client device, wherein the second packet comprises the IP address of the service node, a port number of the service node, and a connection identifier identifying a connection established between the client device and the service node;
   receive, from the client device, a third packet that comprises the connection identifier and 5-tuple information, wherein a destination address of the third packet is the IP address of the service node that is different from the destination address of the first packet, and wherein a destination port number of the third packet is the port number of the service node; and
   determine, based on the 5-tuple information and the connection identifier comprised in the third packet, that the third packet belongs to the connection.

8. The service node according to claim 7, wherein the second packet is a quick user datagram protocol internet connections (QUIC) protocol-based packet.

9. The service node according to claim 7, wherein the first packet is a QUIC initial packet, the second packet is a QUIC handshake packet or a QUIC retry packet.

10. The service node according to claim 7, wherein a source address of the first packet is an IP address of the client device, a source address of the second packet is the IP address of the service node, and a destination address of the second packet is the IP address of the client device.

* * * * *